(12) United States Patent
Davis et al.

(10) Patent No.: US 10,758,915 B2
(45) Date of Patent: Sep. 1, 2020

(54) MATERIAL REDUCTION SYSTEM AND PROCESSING TOOLS FOR A MATERIAL PROCESSING MACHINE

(71) Applicant: Bandit Industries, Inc., Remus, MI (US)

(72) Inventors: Derrick Lee Davis, Blanchard, MI (US); Michael B. Morey, Shephard, MI (US)

(73) Assignee: Bandit Industries, Inc., Remus, MI (US)

( * ) Notice: Subject to any disclaimer, the term of this patent is extended or adjusted under 35 U.S.C. 154(b) by 778 days.

(21) Appl. No.: 15/277,358

(22) Filed: Sep. 27, 2016

(65) Prior Publication Data

US 2017/0087558 A1    Mar. 30, 2017

Related U.S. Application Data

(60) Provisional application No. 62/233,392, filed on Sep. 27, 2015.

(51) Int. Cl.
*B02C 18/18* (2006.01)
*B02C 4/30* (2006.01)
(Continued)

(52) U.S. Cl.
CPC ............ *B02C 18/18* (2013.01); *A01G 23/067* (2013.01); *B02C 4/305* (2013.01);
(Continued)

(58) Field of Classification Search
CPC ........... B02C 4/30; B02C 4/305; B02C 13/28; B02C 13/2804; B02C 2210/02; B02C 18/18
(Continued)

(56) References Cited

U.S. PATENT DOCUMENTS 3,642,214 A    2/1972  Blackwell, Jr.
4,785,860 A   11/1988  Arasmith
(Continued)

OTHER PUBLICATIONS

Bandit Industries, Inc. "The Beast Horizontal Grinders, Wear Parts Catalog", Sep. 21, 2016, pp. 1-19.

*Primary Examiner* — Shelley M Self
*Assistant Examiner* — Katie L. Parr
(74) *Attorney, Agent, or Firm* — Howard & Howard Attorneys PLLC

(57) ABSTRACT

A material reduction system and processing tool for a material processing machine. The material reduction system comprises a tool holder fixedly mounted to a rotary drum. A leading member defines a raker surface oriented away from the operating direction at a first predefined angle. A processing tool is removably coupled to the tool holder. A leading face of the processing tool is oriented toward the operating direction at a second predefined angle. The first and second predefined angles are such that material is directed into contact with the reducing member to limit material contact with the tool body and the tool holder. An upper flange of the processing tool directly abuts the tool holder to direct material away from the tool holder. The upper flange and a lower flange define a tool recess configured to receive a projection from the tool holder to prevent rotation of the processing tool.

11 Claims, 13 Drawing Sheets

(51) Int. Cl.
*B02C 13/28* (2006.01)
*B02C 21/02* (2006.01)
*A01G 23/06* (2006.01)

(52) U.S. Cl.
CPC ........ *B02C 13/2804* (2013.01); *B02C 21/026* (2013.01); *B02C 2210/02* (2013.01)

(58) Field of Classification Search
USPC ................ 241/197, 291, 292, 294, 295, 300
See application file for complete search history.

(56) References Cited

U.S. PATENT DOCUMENTS

| | | | |
|---|---|---|---|
| 5,464,164 A * | 11/1995 | Doppstadt | B02C 13/28 241/197 |
| 6,293,481 B1 | 9/2001 | Ragnarsson | |
| 6,464,157 B1 * | 10/2002 | Balvanz | B02C 13/2804 241/191 |
| 6,517,020 B1 | 2/2003 | Smith | |
| 6,764,035 B2 | 7/2004 | Denis et al. | |
| 6,845,931 B1 | 1/2005 | Smith | |
| 7,004,413 B2 | 2/2006 | Langlois | |
| 7,121,485 B2 | 10/2006 | Smith | |
| 7,222,808 B2 | 5/2007 | Edwards | |
| 7,281,676 B1 * | 10/2007 | Bennington | A01G 23/093 241/294 |
| 7,380,576 B2 | 6/2008 | Pizzuto | |
| 7,384,011 B1 | 6/2008 | Smith | |
| 7,726,594 B2 | 6/2010 | Smith | |
| 7,938,350 B2 | 5/2011 | Doppstadt et al. | |
| 8,540,033 B2 | 9/2013 | Stanley et al. | |
| 8,550,391 B2 | 10/2013 | Denis et al. | |
| 8,870,107 B2 | 10/2014 | Smith | |
| 9,192,938 B2 | 11/2015 | Grover | |
| 9,333,508 B2 | 5/2016 | Denis et al. | |
| 9,561,551 B2 * | 2/2017 | Diego | B02C 18/18 |
| 2001/0045478 A1 * | 11/2001 | Recker | B02C 18/145 241/294 |
| 2005/0098331 A1 * | 5/2005 | Edwards | A01B 33/103 172/701.3 |
| 2008/0283257 A1 * | 11/2008 | Edwards | A01B 33/103 172/256 |
| 2009/0014189 A1 | 1/2009 | Stanley et al. | |
| 2009/0050341 A1 | 2/2009 | Hathaway et al. | |
| 2014/0034765 A1 * | 2/2014 | Lafond | B02C 4/08 241/197 |
| 2015/0001326 A1 | 1/2015 | Smith | |
| 2015/0014458 A1 | 1/2015 | Pfoltner et al. | |
| 2015/0078843 A1 * | 3/2015 | Diego | B23C 5/22 407/103 |
| 2015/0375233 A1 | 12/2015 | Daining et al. | |
| 2017/0259271 A1 * | 9/2017 | Noel | A01B 33/103 |

\* cited by examiner

MATERIAL REDUCTION SYSTEM AND PROCESSING TOOLS FOR A MATERIAL PROCESSING MACHINE

CROSS REFERENCE TO RELATED APPLICATIONS

This application claims priority under 35 U.S.C. § 119 to U.S. Provisional Patent Application Ser. No. 62/233,392, filed on Sep. 27, 2015, the contents of which are hereby incorporated by reference in its entirety.

BACKGROUND

A variety of machines have been developed to recycle, reduce, or otherwise process materials such as trees, brush, and other vegetation. The processing machines chip, cut, grind, shred, pulverize or otherwise reduce the material. Exemplary material processing machines include chippers, grinders, shredders, hammer mills, forestry mulchers, and the like.

Forestry mulching is a land clearing method of particular interest and development. The forestry mulcher, also referred to as a masticator or brushcutter, typically comprises a hydraulically-powered mulching attachment removably coupled to a tractor or other implement. The mulching attachment typically comprises a rotary drum equipped with processing tools disposed about the drum. The processing tools reduce the material as the implement forcibly urges the rotating processing tools into direct contact with the material sought to be reduced. Given the operating conditions associated with forestry mulching and similar operations, those having skill in the art readily appreciate the marked mechanical stress and wear endured by many of the components of the processing machine.

Due to these demands of forestry mulching and similar operations, the processing tools typically comprise a replaceable tool head—often called a "wear part"—removably coupled to a tool holder fixedly secured to the rotary drum. The tool head is positioned in an operating direction typically the rotational direction of the rotary drum. Relative to the tool holder and rotary drum, the time and expense associated with repair and/or replacement of the tool heads are appreciably less. Thus, during operation of the processing machine, it is desirable to concentrate contact between the material and the tool head, thereby focusing wear on the tool head and limiting wear on the tool holder and rotary drum.

Known systems, however, do not adequately limit contact between the material and the tool holder and rotary drum. As the rotary drum rotates in the operating direction, the material undesirably contacts the rotary drum prior to the tool head or after engagement with the tool head. Often, the material also undesirably contacts the tool holder prior to the tool head. In addition to the stress and wear endured by the drum and the tool holder, suboptimal cutting depth to suitably reduce the material often results.

Likewise, subsequent to the material "passing" each of the tool heads, known systems do not adequately limit wear to the tool holder adjacent the cutting head opposite the operating direction. In addition to the wear endured by the tool holder, the result often prevents the known systems from using relatively simpler means of connection between the tool head and the tool holder.

Therefore, a processing tool system for a material processing machine designed to overcome one or more of the aforementioned disadvantages is desired.

SUMMARY OF THE DISCLOSURE

According to an exemplary embodiment of the present disclosure, a material reduction system comprises a rotary drum rotatable about a longitudinal axis in an operating direction. The rotary drum has an outer surface spaced from the longitudinal axis by a radius of curvature. A tool holder comprises a base portion fixedly mounted to the outer surface of the rotary drum, and a tool mounting portion extending upwardly from the base portion. The base portion has a leading member extending in the operating direction. The leading member defines a raker surface oriented away from the operating direction at a first predefined angle. The material reduction system further comprises a processing tool having a tool body abutting the tool mounting portion and removably coupled to the tool holder. A reducing member is coupled to the tool body. The reducing member defines a leading face oriented toward the processing direction at a second predefined angle. The first and second predefined angles are such that material is directed into contact with the reducing member to limit contact with the tool body and the tool mounting portion during operation of the material reduction system.

According to another exemplary embodiment of the present disclosure, a material reduction system comprises a rotary drum rotatable about a longitudinal axis in an operating direction. The rotary drum has an outer surface spaced from the longitudinal axis by a radius of curvature. A tool holder comprises a base portion fixedly mounted to the outer surface of the rotary drum. The base portion comprises a leading member extending in the operating direction and a trailing member extending in an opposite direction from the leading member. The tool holder further comprises a tool mounting portion extending upwardly from the base portion. The tool mounting portion has a forward surface facing the operating direction, a rearward surface facing an opposite direction from the forward surface, and an upper surface between the forward and rearward surfaces. A processing tool is removably coupled to the tool holder. The processing tool has a tool body directly abutting the forward surface of the tool mounting portion. The process tool has an upper flange directly abutting at least a portion of the upper surface of the tool mounting portion to direct material away from the upper and rearward surfaces of the tool mounting portion during operation of the material reduction system.

According to another exemplary embodiment of the present disclosure, a processing tool is configured to be removably coupled to a tool holder of a material reduction system with the tool holder having a projection. The processing tool comprising a top surface, a bottom surface opposite said top surface, and opposing sides separated by said top and bottom surfaces. A leading face of the processing tool faces an operating direction. A tool mounting surface of the processing tool is opposite said leading face for directly abutting at least a portion of the tool holder. The tool mounting surface comprises an upper flange and a lower flange for receiving the projection from the tool holder to prevent rotation of said processing tool relative to the tool holder.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

Figure 1:
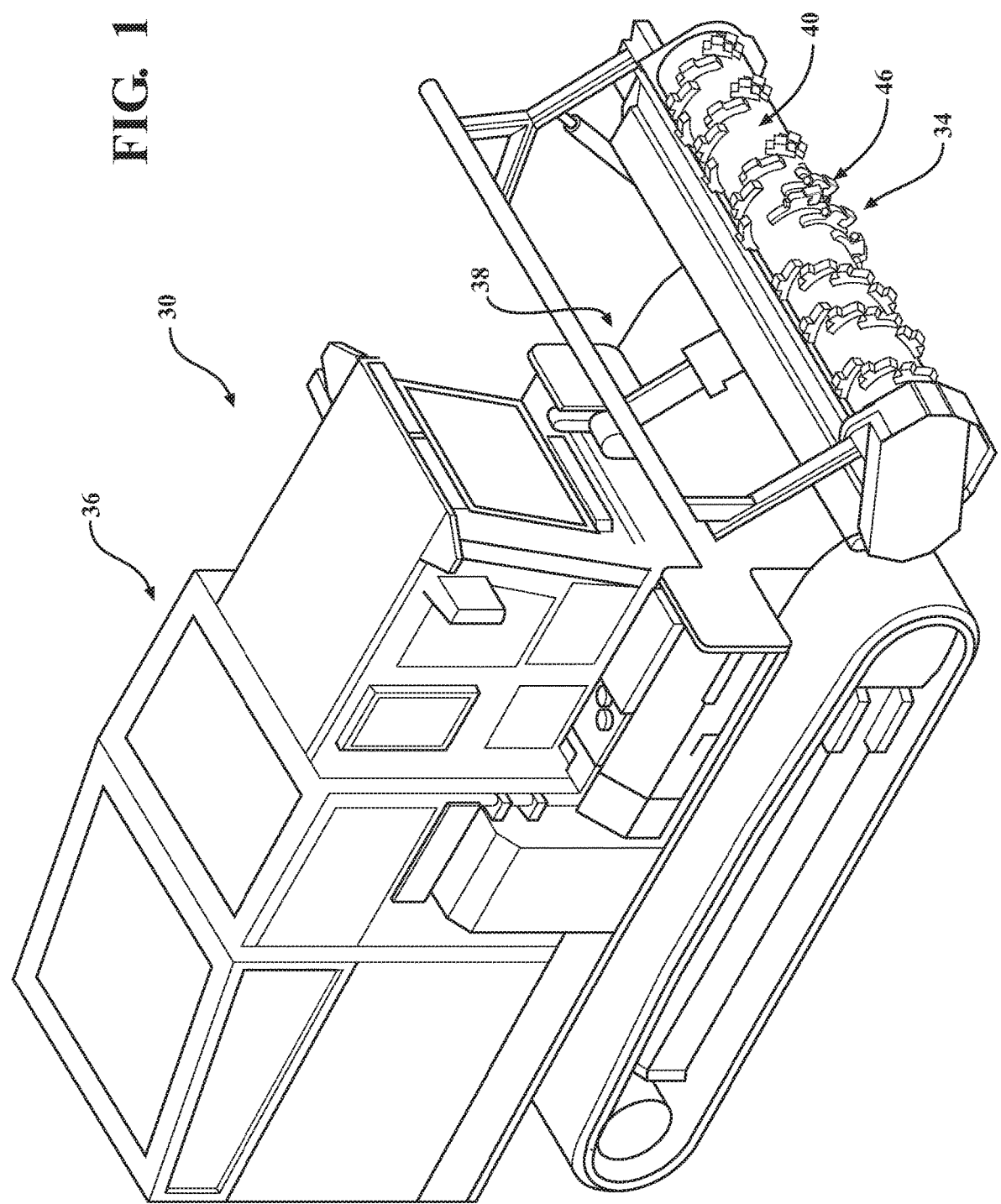
FIG. 1 is a perspective view of a material processing machine comprising a material reduction system in accordance with an exemplary embodiment of the present disclosure.

FIG. 1 illustrates an exemplary material processing machine 30 comprising a material reduction system 34 coupled to an implement 36. The implement 36 may comprise a multi-purpose vehicle configured to be removably coupled to a variety of powered material reduction operations. The illustrated embodiment comprises a forestry mulcher coupled to the implement 36 comprising a two-tracked vehicle configured to be driven by an operator situated in a cabin. During operation, the implement 36 forcibly urges the material reduction system 34 into direct contact with the material to reduce stumps, trees, brush, and vegetation, and the like. The implement 36 may be powered by an internal combustion engine having 100, 200, 400 or more horsepower. In addition to a forestry mulcher, the present disclosure contemplates that the material reduction system 34 disclosed herein may be implemented into any number of operational contexts, including shredders, chippers, grinders, crushers, and the like. The present disclosure further contemplates that the material reduction system 34 may be incorporated into a generally non-movable implement as opposed to being coupled to a drivable implement 36. In such an alternative embodiment, the material sought to be reduced may be transported to and fed into the generally stationary apparatus, after which the advantages of the material reduction system 34 described herein are similarly realized.

With continued reference to FIG. 1, attachment means 38 removably couple the material reduction system 34 and the implement 36. The attachment means 38 may take on any known or conventional design. In one example, the attachment means 38 comprise generally U-shaped forks configured to couple with one or more elongated transverse members. The material reduction system 34 is preferably hydraulically powered through means commonly known in the art. The material reduction system 34 and/or the implement 36 may comprise fluid sources, pumps, valves, fluid lines, and other components required to hydraulically operate the material reduction system 34.

Figure 2:
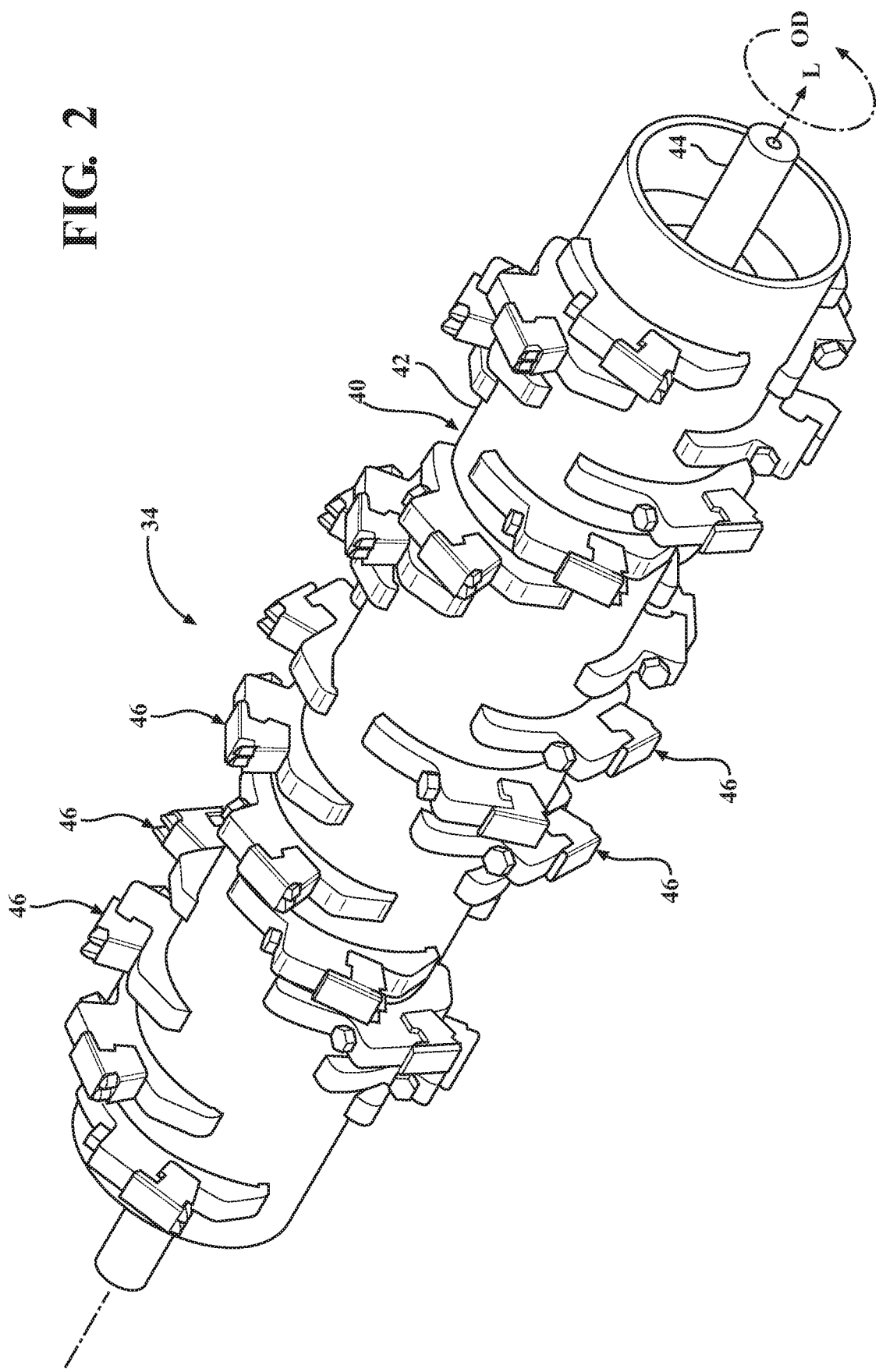
FIG. 2 is a perspective view of the material reduction system of FIG. 1.
Figure 3:
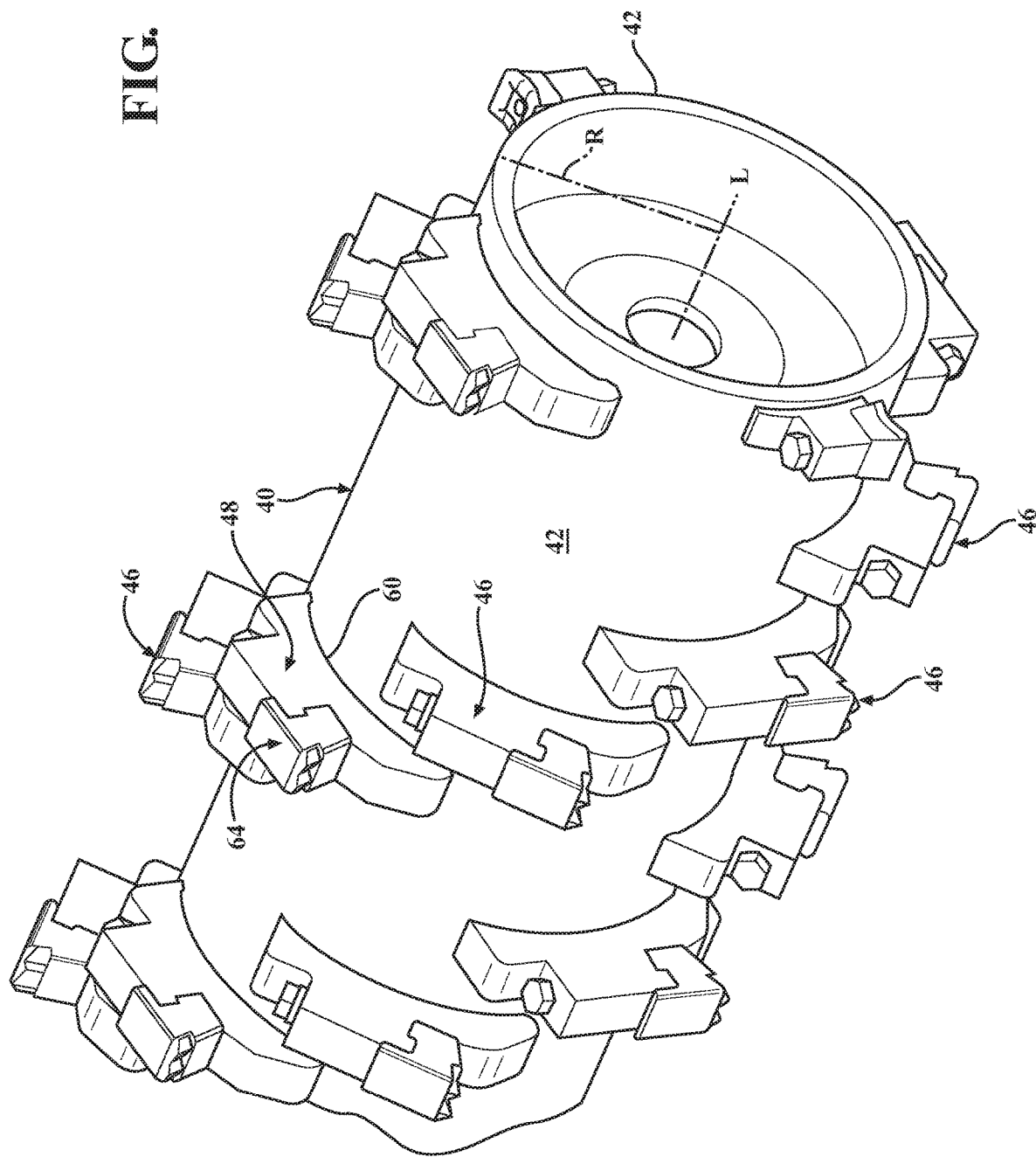
FIG. 3 is a fragmented perspective view of the material reduction system of FIGS. 1 and 2.

The material reduction system 34 in accordance with an exemplary embodiment of the present disclosure is illustrated in FIGS. 2 and 3. The material reduction system 34 comprises a rotary drum 40. Referring to FIGS. 2 and 3, the rotary drum 40 is tubular or cylindrical in shape and comprises opposing ends. The rotary drum 40 is rotatable about a longitudinal axis L extending between the opposing ends. The rotary drum 40 further comprises an outer surface 42 spaced apart from the longitudinal axis L by a radius of curvature R as shown in FIG. 3. In other words, the distance between the outer surface 42 and the longitudinal axis L defines a radius of curvature R of the rotary drum 40. Other suitable shapes of the rotary drum are contemplated such as a hexagon, octagon, decagon, and the like.

The rotary drum 40 is operably coupled to or otherwise integral with a shaft 44 extending coaxially through the rotary drum 40, as illustrated in FIG. 2. The shaft 44 has opposing ends operably coupled to drive means (not shown) associated with the material reduction system 34. Via the drive means or otherwise, the rotary drum 40 is configured to rotate about the longitudinal axis L in an operating direction OD. The perspective view of FIG. 2 shows the operating direction OD in a counterclockwise direction.

The material reduction system 34 comprises one or more processing tool systems 46. FIGS. 2 and 3 illustrate a plurality of processing tool systems 46 operably coupled to the rotary drum 40. More specifically, the processing tool systems 46 are operably coupled to the outer surface 42 of the rotary drum 40. The processing tool systems 46 may be arranged on the outer surface 42 in any number of desired configurations. For example, the illustrated embodiment shows the processing tool systems 46 arranged in a generally spiral configuration between the opposing ends of the rotary drum 40. Among other advantages, the spiral configuration may optimize "coverage" of the processing tool systems 46 about the rotary drum 40 to limit abrasion of the material on the rotary drum 40 and promote a smoother, shaving-style cutting operation. Further, the spiral configuration may urge the reduced material towards a center (i.e., generally midway between the opposing ends) of the rotary drum 40, which concentrates the processed material. Directing the reduced material towards the center improves mulching operations and prevents debris from encroaching on the bearings of the shaft 44. The processing tool systems 46 may be arranged in any advantageous manner based on the application or otherwise.

Figure 4:
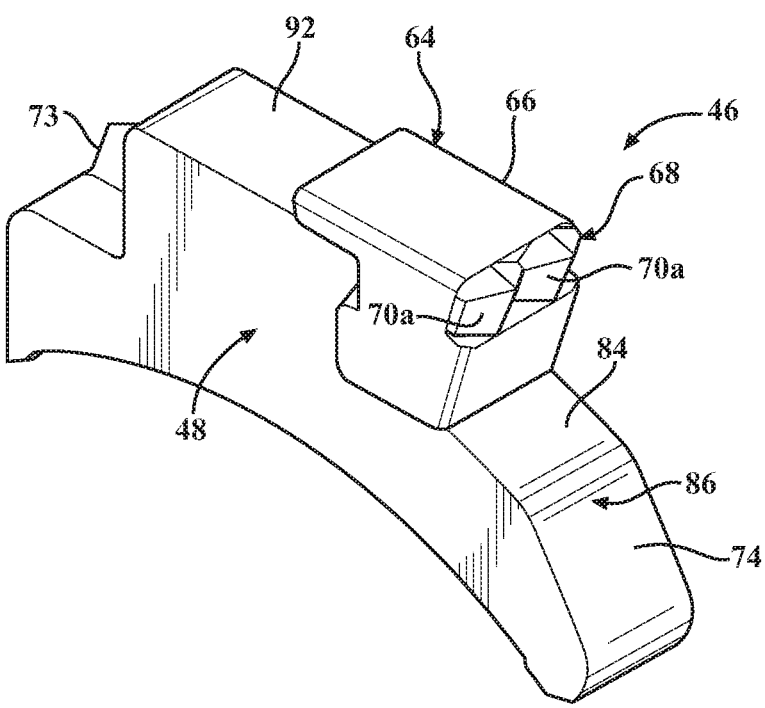
FIG. 4 is a perspective view of a processing tool system in accordance with an exemplary embodiment of the present disclosure.
Figure 5:
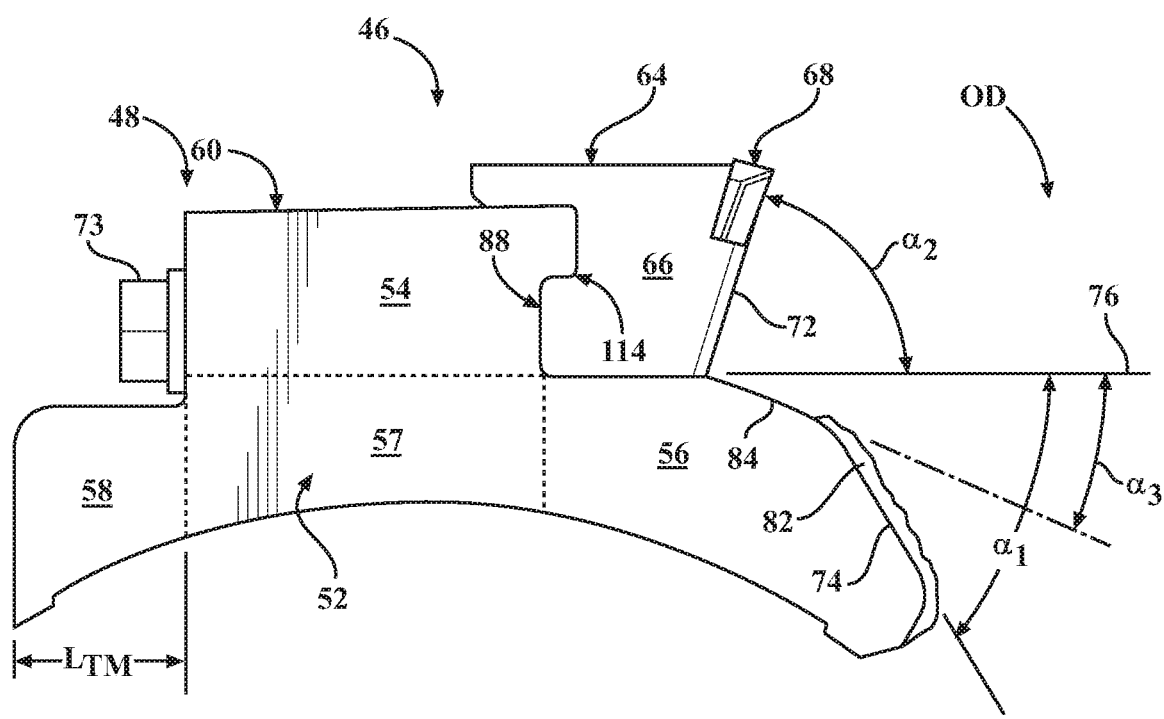
FIG. 5 is a side elevation view of the processing tool system of FIG. 4.
Figure 6A:
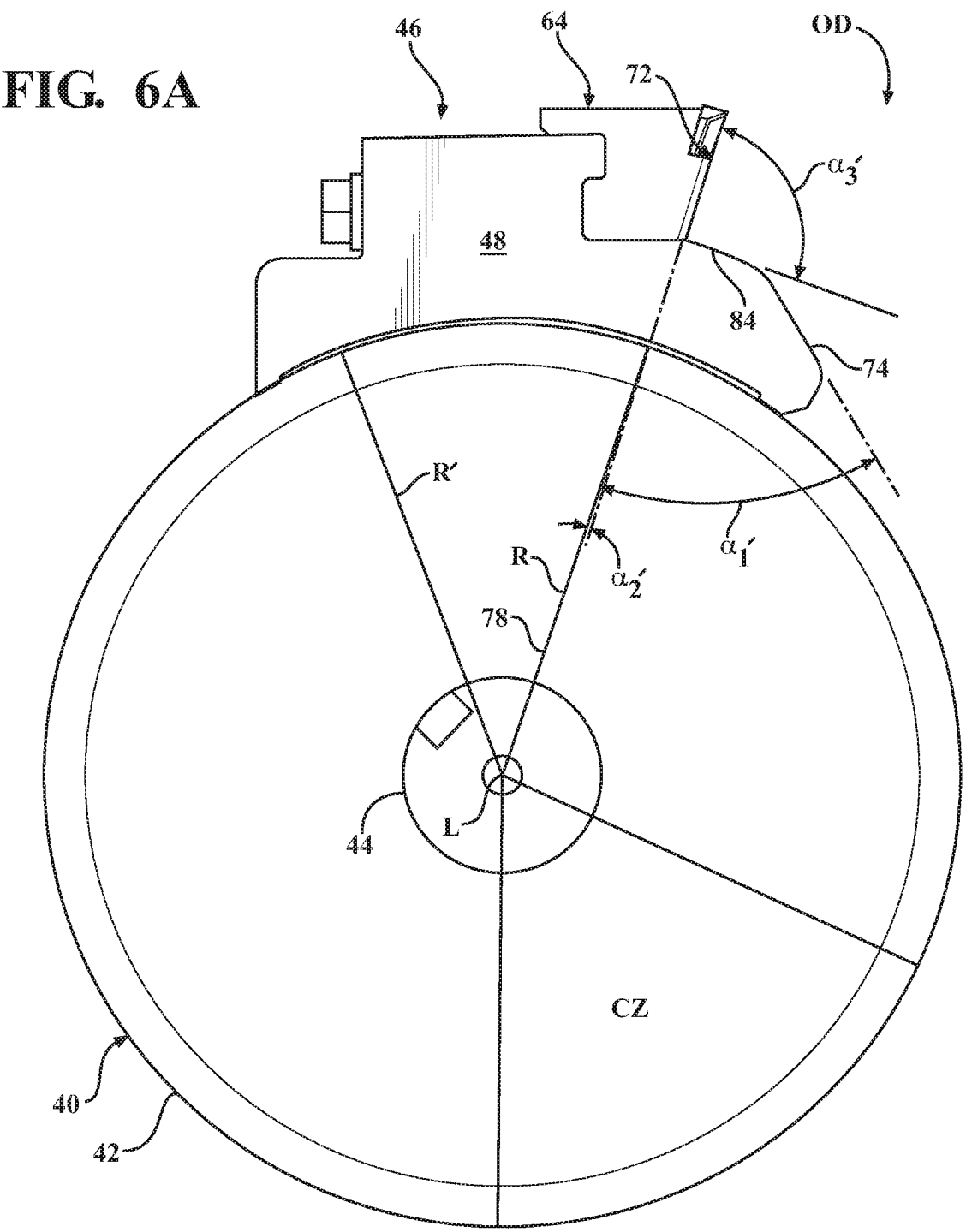
FIG. 6A is a side elevation view of the processing tool system of FIG. 4 mounted on a schematic representation of a rotary drum.

FIGS. 4, 5 and 6A show an exemplary processing tool system 46. The processing tool system 46 comprises a tool holder 48 configured to be fixedly mounted on the outer surface 42 of the rotary drum 40. Preferably, the tool holder 48 is welded to the outer surface 42 of the rotary drum 40, as described in detail below, but other joining means are contemplated.

The tool holder 48 may comprise a main body 50. With reference to FIG. 5, the tool holder 48 comprises a base portion 52 and a tool mounting portion 54. Each of the base portion 52 and the tool mounting portion 54 may be unitary or monolithic and comprise the main body 50. Alternatively, the base portion 52 and the tool mounting portion 54 may be discrete structures operably coupled to one another to comprise the main body 50. As illustrated in FIG. 5, the tool mounting portion 54 is positioned superiorly to the base portion 52. In other words, the tool mounting portion 54 extends upwardly from the base portion 52.

In an exemplary embodiment, the base portion 52 is generally C-shaped and comprises an arcuate drum mounting surface 60 having a radius of curvature R' substantially equal to the radius of curvature R of the rotary drum 40. The radius of curvature R' of the drum mounting surface 60 may be relative to the longitudinal axis L of the rotary drum 40 (see FIG. 6A). The drum mounting surface 60 is fixedly mounted to the outer surface 42 of the rotary drum 40, as best shown in FIG. 3. As described below, the drum mounting surface 60 is preferably welded to the outer surface 42 of the rotary drum 40.

The base portion 52 may further comprise a leading member 56 and a trailing member 58. The leading member 56 extends in the operating direction OD, whereas the trailing member 58 extends in an opposite direction of the leading member 56 or away from the operating direction OD. In other words, the leading member 56 and the trailing member 58 are positioned opposite a central portion 57 of the base portion 52. Each of the base portion 52, the leading member 56, and the trailing member 58 may be unitary or monolithic. Alternatively, one or more of the leading member 56 and the trailing member 58 may be discrete structures operably coupled to the central portion 57 to comprise the base portion 52. In an exemplary embodiment, each of the leading member 56 and the trailing member 58 is an arm or a wing-like structure of the base portion 52. Each of the leading member 56 and the trailing member 58 may comprise a portion of the drum mounting surface 60 such that the drum mounting surface 60 comprises a smooth arc along substantially an entirety of the base portion 52. Among other advantages disclosed herein, the leading member 56 and the trailing member 58 provide wider contact points between the drum mounting surface 60 and the outer surface 42 of the rotary drum 40, which is desirable based on the demands of the material reduction system 34.

The material reduction system 34, and more specifically the processing tool system 46, comprises a processing tool 64 removably coupled to the tool holder 48. The processing tool 64 comprises a tool body 66 and a reducing member 68 coupled to the tool body 66. The reducing member 68 is the component of the material reduction system 34 that typically reduces the material during operation of the material processing machine 30. In other words, the reducing member 68 is fabricated from suitable material and in a suitable shape so as to chip, cut, grind, shred, pulverize or otherwise reduce the material. Those having skill in the art readily appreciate the reducing member 68 is typically fabricated, at least in part, from carbide to meet the demands of the application; however other sufficiently hard and/or hardened materials are contemplated. FIG. 4 illustrates one exemplary embodiment of the reducing member 68 comprising two processing teeth 70a arranged in a side-by-side configuration. Other exemplary reducing members 68 are described in detail below.

With continued reference to FIGS. 4, 5 and 6A, the processing tool 64 is removably coupled to the tool holder 48, and more particularly to the tool mounting portion 54 of the main body 50 of the tool holder 48. A fastener 73 couples the processing tool 64 and the tool mounting portion 54. To that end, a borehole 75 extends through the tool mounting portion 54 of the tool holder 48. The borehole 75 is configured to receive the fastener 73. Based on one or more features of the present disclosure, as described in detail below, the fastener 73 may comprise a singular standard Hex bolt commonly known in the art.

In the broadest sense, operation of the material processing machine 30 comprises rotating the rotary drum 40 of the material reduction system 34 in the operating direction OD. The processing tool systems 46 coupled to the rotary drum 40 are likewise rotated and forcibly urged into direct contact with the material sought to be reduced. The reducing member 68 of the processing tool 64 reduces the material as the processing tool system 46 sweeps by the material in the operating direction. Yet known systems do not adequately limit contact of the material with the tool holder and/or drum, thereby accelerating undesirable wearing of these components. It is an advantage of the present disclosure to direct, urge, or otherwise guide material into contact with the reducing member 68 to not only limit contact of the material with the tool body 68 (of the processing tool 64) and the tool mounting portion 54 (of the tool holder 48), but also improve the overall efficiency of the processing operation.

As mentioned, the base portion 52 comprises the leading member 54 extending in the operating direction OD, as illustrated in FIG. 5. The leading member 54 defines a raker surface 74 oriented away from the operating direction OD. With reference to FIG. 5 showing a clockwise operating direction, "oriented away" comprises a negative slope when viewed in elevation. Stated differently, raker surface 74 being "oriented away" results in the material translating or moving across the raker surface 74 as the processing tool 46 rotates in the operating direction OD.

The raker surface 74 may be positioned in a manner to contact the material prior to the processing tool 64. The raker surface 74 is configured to direct material into contact with the reducing member 68 of the processing tool 64. To that end, the raker surface 74 is oriented away from the operating direction OD at a first predefined angle $\alpha_1$. In one exemplary embodiment illustrated in FIG. 5, the raker surface 74 is planar and aligned with at least a portion of the reducing member 68. In such an embodiment, the first predefined angle $\alpha_1$ may be such that the raker surface 74 is substantially collinear with at least a portion of the reducing member 68.

Likewise, the reducing member 68 defines a leading face 72 oriented towards the operating direction OD. With continued reference to FIG. 5, the leading face 72 may further be defined by a portion of the tool body 66. In other words, the leading face 72 may comprise a portion of the tool body 66 facing the operating direction OD, and a portion of the reducing member 68 facing the operating direction OD. More specifically, the reducing member 68 comprises a portion of the leading face 72 of the processing tool spaced apart from the base portion 52 of the tool holder 48 by a portion of the tool body 66. The leading face 72 is oriented towards the operating direction OD at a second predefined angle $\alpha_2$.

The first and second predefined angles $\alpha_1$ and $\alpha_2$ are such that material is directed into contact with the raker surface 74 and the reducing member 68 to limit contact of the material with the tool body 66 and the tool mounting portion 54 during operating of the material reduction system 34. In one exemplary embodiment illustrated in FIG. 5, the first and second predefined angles $\alpha_1$ and $\alpha_2$ may be relative to a line 76 separating the base portion 50 and the tool mounting portion 54 of the tool holder 48. In such an embodiment, each of the first and second predefined angles $\alpha_1$ and $\alpha_2$ may be acute angles. In one example, the first predefined angle $\alpha_1$ may be between 45 and 75 degrees, and the second predefined angle $\alpha_2$ may be between 55 and 85 degrees. In another example, the first predefined angle $\alpha_1$ may be between 55 and 65 degrees, and more particularly 58 degrees, and the second predefined angle $\alpha_2$ may be between 65 and 75 degrees, and more particularly 72 degrees. In many respects, the first and second predefined angles $\alpha_1$ and $\alpha_2$ may be codependent. That is, the second predefined angle $\alpha_2$ may be selected based, at least in part, on the first predefined angle $\alpha_1$ such that material is directed into contact with the reducing member 68. In one example, the leading face 72 of the processing tool 64 is angled relative to the raker surface 74—the sum of first and second predefined angles $\alpha_1$ and $\alpha_2$—at an angle between 120 and 140 degrees.

Referring now to FIG. 6A, the first and second predefined angles $\alpha_1'$ and $\alpha_2'$ may be relative to a line 78 comprising the radius of curvature R of the rotary drum 40 extending through the reducing member 68 or other suitable structure on the processing tool system 46. FIG. 6A shows a processing tool system 46 mounted on the rotary drum 40. The line 78 extends from the longitudinal axis L of the rotary drum 40 to the reducing member 68 of the processing tool 64. As shown in FIG. 6A, the first predefined angle $\alpha_1'$ is defined between the raker surface 74 and the line 78, and the second predefined angle $\alpha_2'$ is defined between the leading face 72 and the line 78. In one example, the first predefined angle $\alpha_1'$ may be between 35 and 55 degrees, and more particularly between 40 and 50 degrees, and the second predefined angle $\alpha_2'$ may be between 1 and 15 degrees, and more particularly between 5 and 7 degrees. The present disclosure contemplates other methods for defining the first and second predefined angles $\alpha_1, \alpha_1'$ and $\alpha_2, \alpha_2'$ relative to a reference structure, line, or other feature not comprising the processing tool system 46 (e.g., a reference line tangent or normal to the outer surface 42 of the rotary drum, a horizontal reference line when the processing tool system 46 is positioned as illustrated in FIG. 6, etc.).

An exemplary operation of the material reducing system 34 of the present disclosure will now be described with reference to FIG. 7. FIG. 7 shows a representation of vegetation V that may be encountered during a land clearing operation. The vegetation V may be a tree, stump, branch, brush, mulch, and the like. The vegetation V may be freely floating mulch, as illustrated, or the vegetation V may be rooted in the ground such as a tree stump. As the rotary drum 40 (not shown in FIG. 7) rotates, the processing tools 46 rotate as well, one of which is illustrated in FIG. 7 for simplicity. The processing tools 46 enter the cutting zone CZ, typically between 4 o'clock and 6 o'clock on the rotary drum 40 when viewed in elevation (see FIG. 6). The processing tools 46 encounter the vegetation V. The leading member 72, and more particularly the raker surface 74, comes into contact with the vegetation V. If rooted, the vegetation V may deflect based, at least in part, on the first predefined angle $\alpha_1, \alpha_1'$. If unrooted, the vegetative debris (e.g., the mulch) is deflected from the raker surface 74 at approximately the first predefined angle $\alpha_1, \alpha_1'$. In either instance, the material is directed or otherwise guided generally towards the reducing member 68.

Further, the leading face 72 is oriented towards the operating direction OD at the second predefined angle $\alpha_2, \alpha_2'$. Together with the first predefined angle $\alpha_1, \alpha_1'$, the second predefined angle $\alpha_2, \alpha_2'$ directs or otherwise guides into contact with the reducing member 68 as opposed to the tool body 66 adjacent the reducing member 68. If, for example, the leading face 72 was oriented towards the operating direction OD at less than a suitable second predefined angle $\alpha_2, \alpha_2'$, the vegetation V may "miss" the reducing member 68. Conversely, if the leading face 72 was oriented towards the operating direction OD at greater than a suitable second predefined angle $\alpha_2, \alpha_2'$, the vegetation V may contact the tool body 66 adjacent the reducing member 68, which is not typically designed to reduce the material. Therefore, in addition to limiting contact with the tool body 66 to minimize wear, the present disclosure may advantageously improve the land clearing operation by controlling the depth at which the reducing member 66 penetrates the material.

Figure 14:
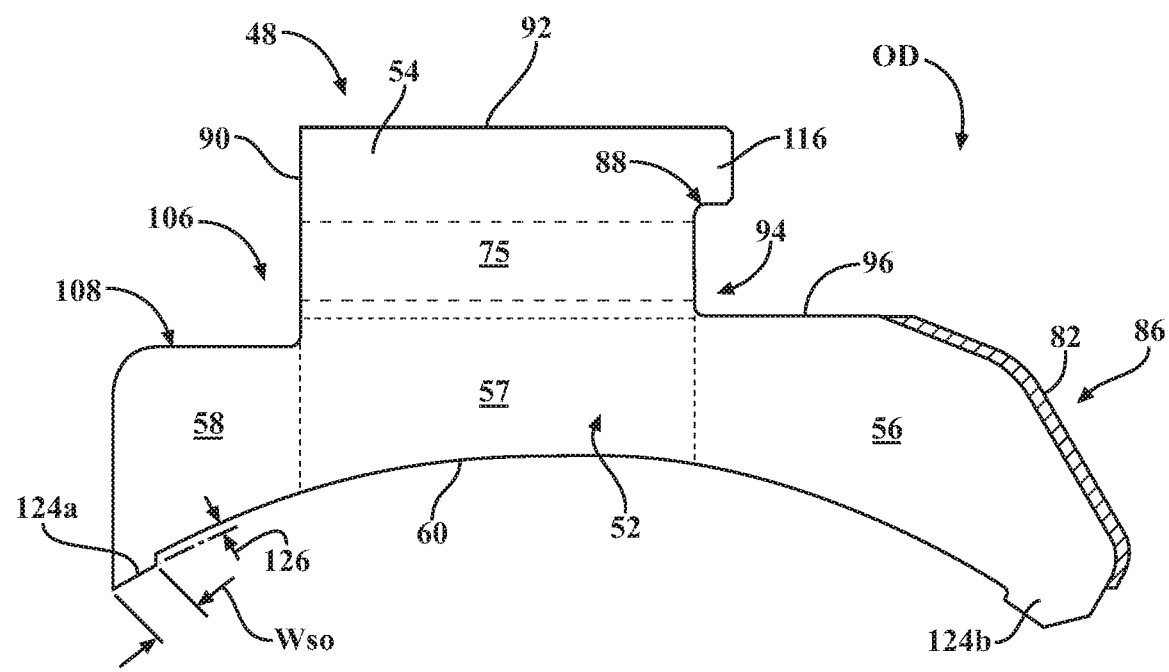
FIG. 14 is a side elevation view of the tool holder of FIG. 13.

As mentioned, the first and second predefined angles $\alpha_1, \alpha_1'$ and $\alpha_2, \alpha_2'$ are such that material is directed into contact with the raker surface 74 and the reducing member 68. Consequently, the material reduction system 34 may further comprise a hardened face 82 coupled to the raker surface 74. The hardened face 82 is configured to provide additional durability to the tool holder 48. FIGS. 5, 7 and 14 illustrate an exemplary hardened face 82. The hardened face 82 may be welded, brazed, or otherwise secured to the raker surface 74. In one example, the hardened face 82 is carbide-embedded, but other suitable materials are contemplated. The hardened face 82 may be generally roughened as shown in FIGS. 5 and 7, or generally smooth as shown in FIG. 14. The present disclosure contemplates the hardened face 82 may be raised from the raker surface 74 as shown in the figures, or recessed within the raker surface 74, after which the hardened face 82 creates a generally flush raker surface 74.

Referring to FIG. 5, the leading member 56 may further define a second raker surface 84. The second raker surface 84 is positioned between the raker surface 74 and the processing tool 64 when the processing tool 64 is coupled to the tool holder 48. The second raker surface 84 may be continuous with first raker surface 74, but oriented at a different angle than the raker surface 74. More specifically, the second raker surface 84 is oriented away from the operating direction OD at a third predefined angle $\alpha_3$. The third predefined angle $\alpha_3$ is preferably less than the first predefined angle $\alpha_1$ such that the second raker surface 84 slopes away from the operating direction OD to a greater extent than the raker surface 74. In one example, third predefined angle $\alpha_3$ is between 15 and 30 degrees, and more approximately 23 degrees relative to the line 76 separating the base portion 52 and the tool mounting portion 54. In another example and with reference to FIG. 6, the third predefined angle $\alpha_3'$ is between 80 and 100 degrees. The raker surface 74 and the second raker surface 84 may be collectively referred to herein as a raker 86. The second raker surface 84 is configured to direct material into contact with the reducing member 68 as the material moves from the raker surface 74 towards the leading face 72 of the processing tool 64.

Figure 6B:
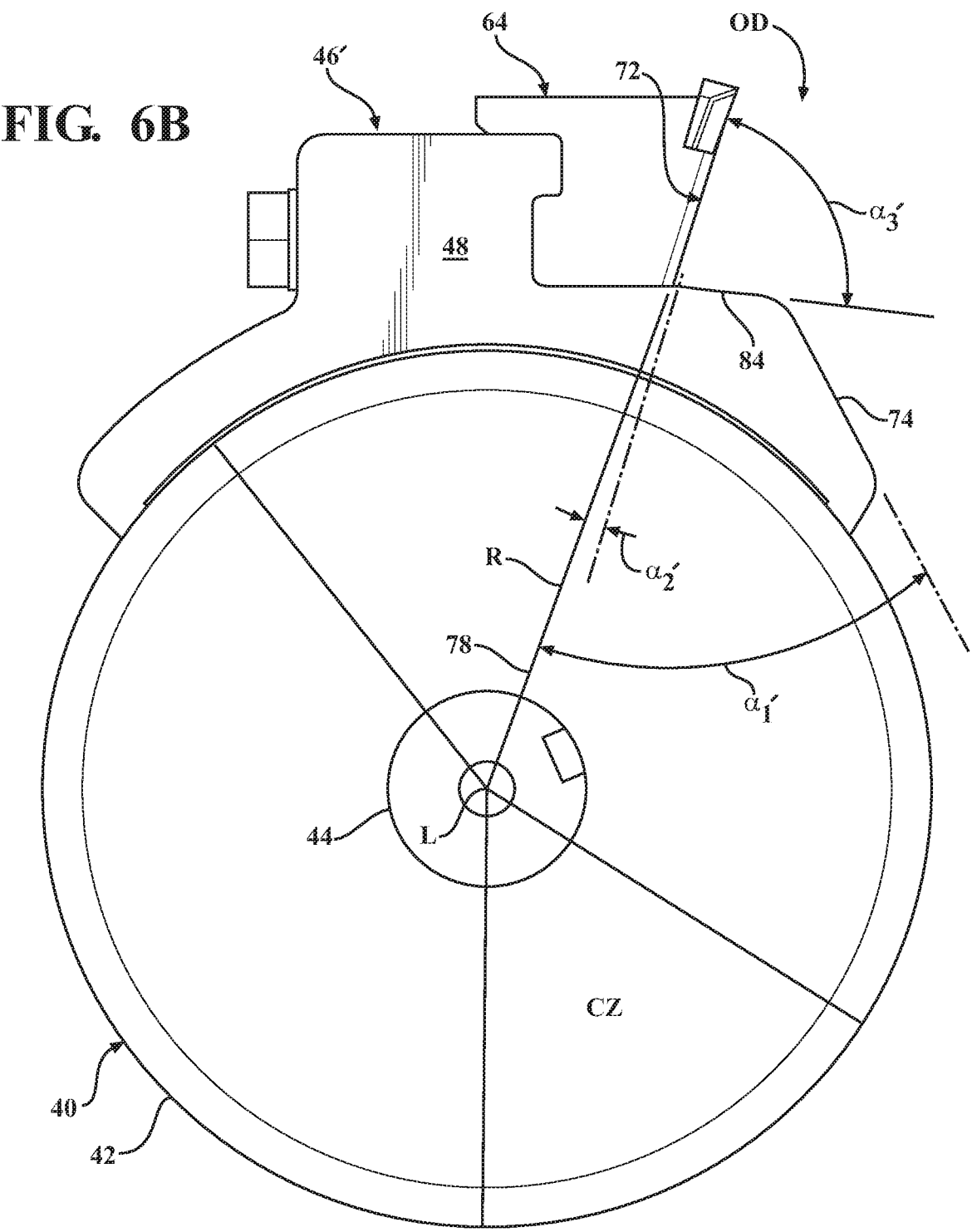
FIG. 6B is a side elevation view of a processing tool system in accordance with another exemplary aspect of the present disclosure mounted on a schematic representation of a rotary drum.
Figure 7:
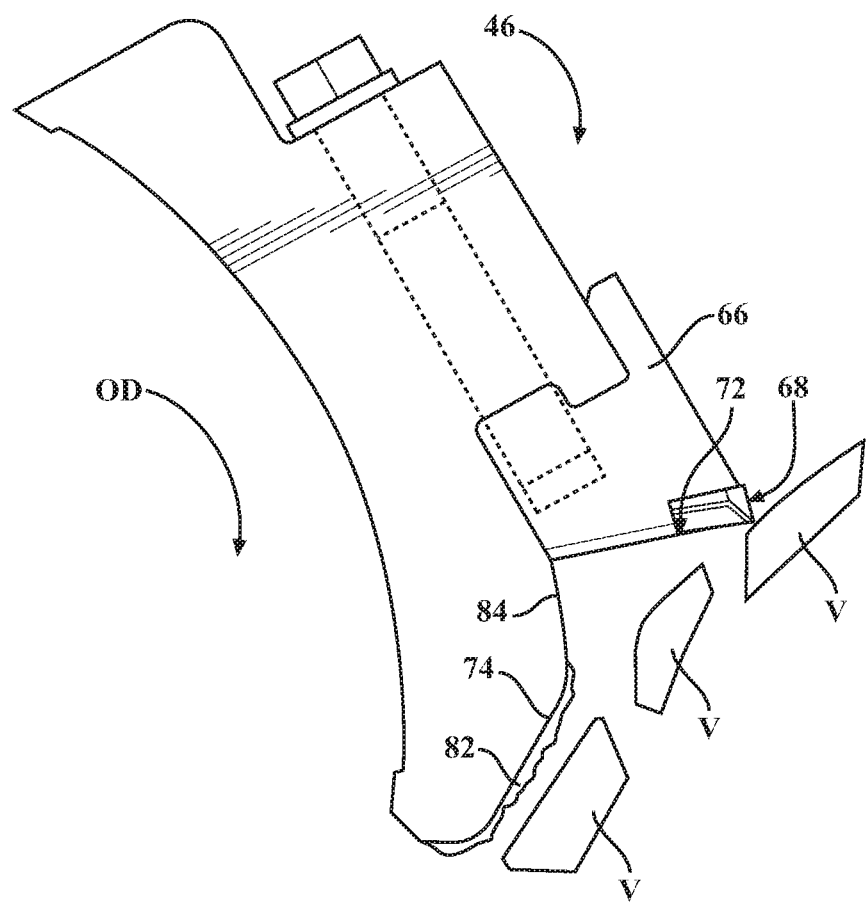
FIG. 7 is a side elevation view of the processing tool system of FIG. 4 positioned in operational engagement with a schematic representation of vegetation.
Figure 8:
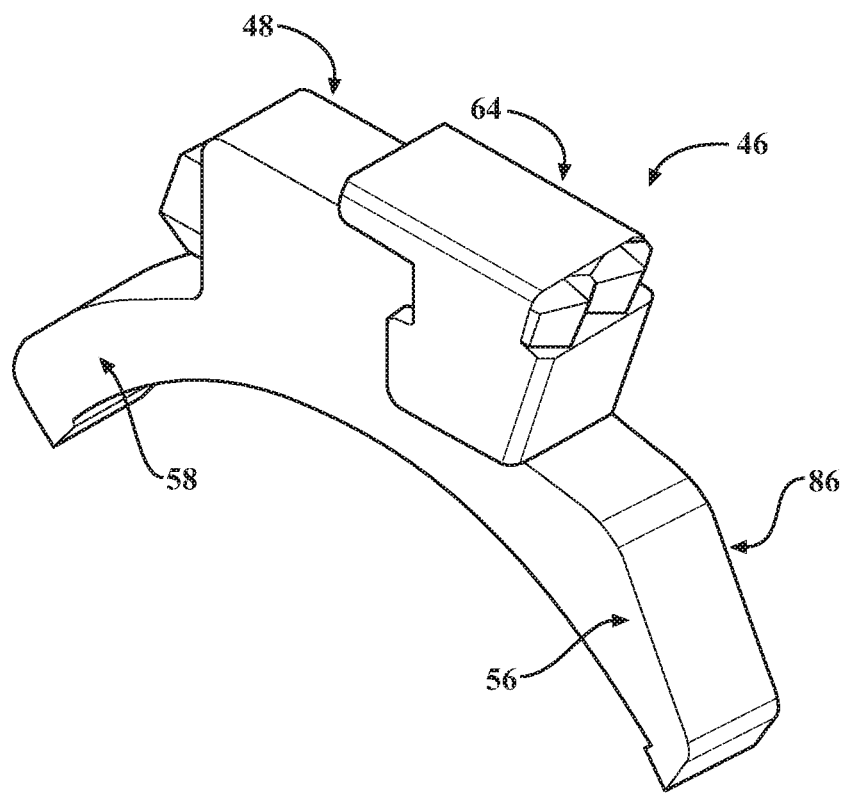
FIG. 8 is a perspective view of the processing tool system of FIG. 6B.
Figure 9:
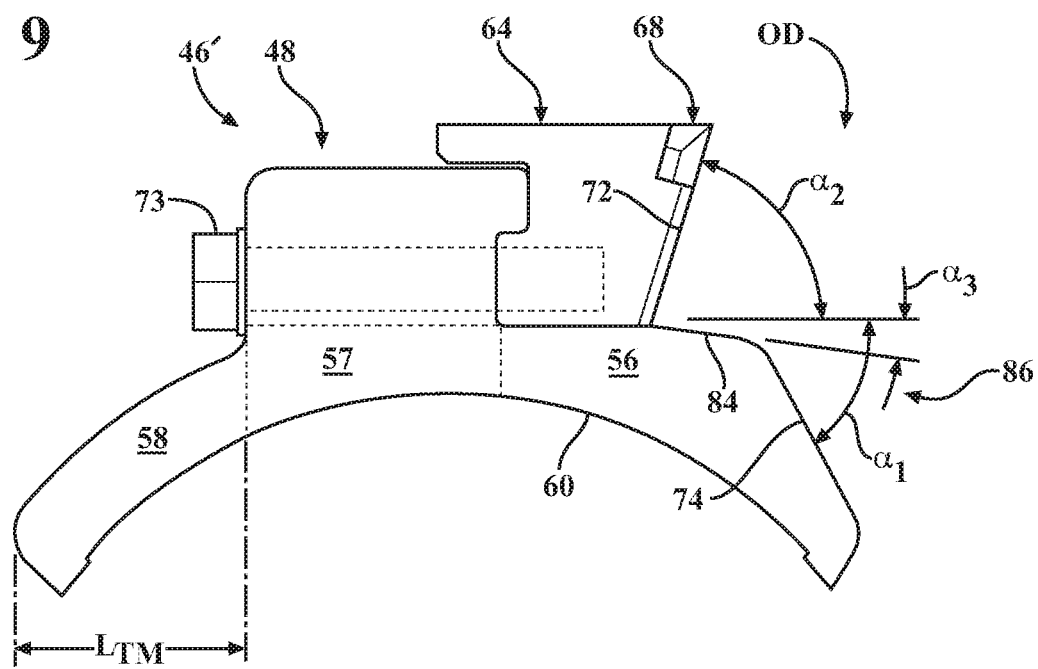
FIG. 9 is a side elevation view of the processing tool system of FIG. 6B.

Referring to FIGS. 6B, 8 and 9, another exemplary embodiment of a tool processing system 46' is illustrated. In many respects, the tool processing system 46' is similar to the tool processing system 46 previously described. As well understood, the tool processing system 46, 46' is coupled to the rotary drum 40, and more particularly, the drum mounting surface 60 of the tool holder 48 is fixedly mounted to the outer surface 42 of the rotary drum 40. Those having skill in the art readily appreciate the size the rotary drum 40 may vary based on any number of factors, including the size of the implement 36, size and/or type of the material to be reduced, and the like. For example, implements 36 with over 200 horsepower may use a drum with a radius of curvature between 25 and 35 inches (e.g., diameter of 64 inches), whereas implements 36 with less than 200 horsepower may comprise a drum with a radius of curvature between 15 and 25 inches (e.g., diameter of 43 inches). Since the drum mounting surface 60 has a shape contoured to the rotary drum 40, it readily follows that the radius of curvature R' of the drum mounting surface 60 is dependent on the radius of curvature R of the rotary drum 40 (see FIGS. 6A and 6B).

The radius of curvature R' of the drum mounting surface 60 may influence the shape of the leading member 56 and/or the trailing member 58. For example, FIGS. 6B and 9 illustrate an exemplary drum mounting surface 60 with a smaller radius of curvature R' than the embodiment illustrated in FIGS. 5 and 6A. Consequently, the leading member 56 and the trailing member 58 have differing characteristics than those previously described in the exemplary embodiment of FIG. 5. One differing characteristic includes the first and third predefined angles $\alpha_1$, $\alpha_1'$ and $\alpha_3$, $\alpha_3'$. Stated differently, the shape of the raker 86, and more particularly the orientations of the raker surface 74 and the second raker surface 84 are different between the two exemplary embodiments.

Because the radius of curvature R' of the drum mounting surface 60 is smaller in the exemplary embodiment of FIGS. 6B and 9, the first predefined angle $\alpha_1$, $\alpha_1'$ is defined accordingly to direct material into contact with the reducing member 68 of the processing tool 64. Particularly when referenced relative to the line 78 extending from the longitudinal axis L of the rotary drum 40 extending through the reducing member 68 (see FIGS. 6A and 6B), the first predefined angle $\alpha_1$, $\alpha_1'$ is less than the similarly defined angle in the exemplary embodiment of FIG. 5. In other words, the raker surface 74 is steeper and/or of greater slope. Among other reasons, the steeper raker surface 74 directs the material more rapidly towards the reducing member 68 because the processing tool system 46 is in the cutting zone CZ for a shorter period of time, which is a function of the size of the rotary drum 40 (i.e., the portion of the outer surface 42 of the rotary drum 40 between the same angular positions is based on the radius of curvature R of the drum). Thus, the first predefined angle $\alpha_1$, $\alpha_1'$ may be based, as least in part, on the radius of curvature R of the rotary drum 40.

Likewise, the third predefined angle $\alpha_3$, $\alpha_3'$ of the exemplary embodiment of FIGS. 6B and 9 is defined accordingly to direct material into contact with the reducing member 68 as the material moves from the raker surface 74 towards the leading face 72 of the processing tool 64. Particularly when referenced relative to the line 78 extending from the longitudinal axis L of the rotary drum 40 extending through the reducing member 68 (see FIGS. 6A and 6B), the third predefined angle $\alpha_3$, $\alpha_3'$ is less than the similarly defined angle in the exemplary embodiment of FIGS. 5 and 6A. In other words, the second raker surface 84 is shallower and/or of lesser slope based, at least in part, on the steeper orientation of the raker surface 74. As such, the third predefined angle $\alpha_3$, $\alpha_3'$ may be based, as least in part, on the radius of curvature R of the rotary drum 40.

In an exemplary embodiment, the second predefined angle $\alpha_2$, $\alpha_2'$ may not be based on the radius of curvature R of the rotary drum 40. In such an embodiment, the leading face 72 of the processing tool 64 is "standardized" and configured to be coupled to tool holders 48 having raker surfaces 74 defining varied first predefined angles $\alpha_1$, $\alpha_1'$. Based on the known characteristics the leading face 72 of the processing tool 64 (i.e., second predefined angle $\alpha_2$, $\alpha_2'$ and distance from bottom surface of tool body 66 to reducing element), the raker 86 is designed accordingly and compensates for the radius of curvature R of the rotary drum 40. Such an example may be particularly appropriate in the context of a catalogue of replaceable wear parts.

In another non-exhaustive example, the present disclosure also contemplates that the second predefined angle $\alpha_2$, $\alpha_2'$ may be based, as least in part, on the radius of curvature R of the rotary drum 40. The processing tools 64 may comprise a specific second predefined angle $\alpha_2$, $\alpha_2'$ that is tailored for specific tool holders 48 and/or specific sizes or rotary drums 40. "Pairing" components in such a manner may be particularly appropriate in applications that require increased control over depth in which the reducing member 68 engages the material.

As mentioned, the radius of curvature R' of the drum mounting surface 60 may influence the shape of the trailing member 58. In one exemplary embodiment, a length of the trailing member is based, at least in part, on said radius of curvature R of the rotary drum 40. The length $L_{TM}$ of the trailing member 58 may be defined as a horizontal distance from the rearward most point of the leading member 58 to a line extending from the rearward surface 90. With reference to FIGS. 5 and 9, the trailing member 58 shown in FIG. 9 has a length $L_{TM}$ greater than the length $L_{TM}$ of the trailing member 58 shown in FIG. 5. FIGS. 6A and 6B illustrate the processing tool systems 46, 46' having trailing members 58 of different length and shape based on the radius of curvature R of the rotary drum 40. Among other reasons, the increase in length is to compensate for a reduction in the radius of curvature R such that the center of gravity of the tool processing system 46 remains aligned with the longitudinal axis L. Those having skill in the art readily appreciate the need for the tool processing system 46 to be radially balanced on the rotary drum.

Figure 10:
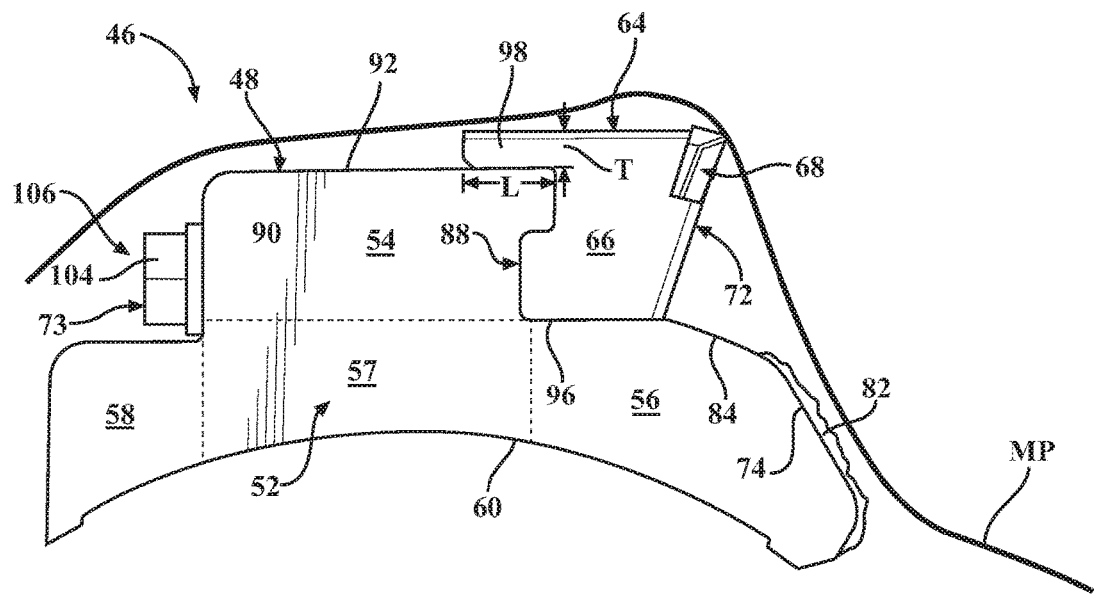
FIG. 10 is a side elevation view of the processing tool system of FIG. 4 with a schematic representation of an exemplary material path during operation of the material reducing operation.

One of the many advantages of the present disclosure is to limit contact between the material and the tool holder (other than the material contacting the raker 86 preferably coupled with the hardened face 82). Referring to FIG. 10, the tool mounting portion 54 extends upwardly from the base portion 52. The tool mounting portion 54 comprises a forward surface 88 facing the operating direction OD, and a rearward surface 90 facing an opposite direction from the forward surface 88. Further, tool mounting portion comprises an upper surface 92 between the forward and rearward surfaces 88 and 90. The forward, rearward and upper surfaces 88, 90, 92 generally define the tool mounting portion 54 extending upwardly from the base portion 52.

The tool body 66 of the processing tool 64 directly abuts the forward surface 88 of the tool mounting portion 54, as illustrated in FIG. 5. With concurrent reference to FIG. 14, the processing tool 64 is positioned within a forward recess 94 defined by or adjacent to the forward surface 88 of the tool mounting portion 54 and a leading upper surface 96 of the base portion 52. The forward recess 94 is sized and shaped such that the leading edge 72 of the processing tool 64 is adjacent the second raker surface 84 when the processing tool 64 is coupled to the tool holder 48.

During operation of known processing tool systems, processed material often undesirably contacts the tool holder and/or rotary drum behind the processing tool. That is, immediately after the material is reduced by the processing tool, the rotating processing tool causes the upper surface of the tool holder to contact the reduced material. In addition to increased wear on the upper surface of the tool holder, the result is associated with disadvantages remedied by the present disclosure.

The processing tool 64 comprising an upper flange 98. When the processing tool 64 is coupled with the tool holder 48. The upper flange 98 is positioned adjacent and extends above at least a portion of the upper surface 92 of the tool holder 48. More specifically, the upper flange 98 may directly abut at least a portion of the upper surface 92 of the tool mounting portion 54. As illustrated in FIG. 5, the upper flange 98 extends rearwardly (i.e., opposite the operating direction OD) above the upper surface 92. The upper flange 98 directs the processed material away from the upper surface 92 and the rearward surface 90 of the tool mounting portion 48 during operation of the material reduction system 34.

FIG. 10 illustrates a representative material path MP during operation of the material reducing system 34. The material path MP is generated by the processing tool system 46 moving relative to the material as the processing tool system 46 rotates via the rotary drum 40. As described in detail above, the material may first contact the raker 86 of the base portion 52. More specifically, the material contacts the raker surface 74. The material path MP is altered based on the first predefined angle $\alpha_1$, $\alpha_1'$ defined by the raker surface 74. Further based on the second predefined angle $\alpha_2$, $\alpha_2'$ defined by the leading face 72 of the processing tool 64, the material path MP contacts the reducing member 68 and material contact with the tool body 66 is limited. Preferably, the material path MP engages the reducing member 68 at a predefined depth to optimize the operation, which may be based on the horsepower of the material processing machine 30, the type of reducing member 68, and the like.

After the material is processed, the material path MP typically trends towards the upper surface 92 of the tool holder 48. Based on the length (i.e., distance between forward surface 88 and rearward surface 90) of the tool mounting portion 54 of the tool holder 48, the material would contact the tool mounting portion 54 in the absence of the upper flange 98 of the present disclosure. Yet, advantageously, the upper flange 98 sufficiently redirects the material path MP such that at least most of the material is prevented from contacting the upper surface 92 and the rearward surface 90, as illustrated in FIG. 10.

The upper flange 98 may comprise any length W and thickness T as necessary. In the exemplary embodiment, the length W of the upper flange 98 extends rearwardly above the upper surface 92 for only a portion of the same. The present disclosure contemplates that the length W of the upper flange 98 may comprise 10, 25, 75, 100 percent or more of the width of the tool mounting portion 48. In one example, the upper flange 98 directly abuts the entire upper surface 92 and terminates proximate to the rearward surface 90. In another example, the upper flange 98 may extend beyond the rearward surface 90. Similarly, the thickness T may be ¼, ½, 1 or more inches. Consideration may be given to the positioning of the reducing member 68 based on different thicknesses T of the upper flange 98. The present disclosure further contemplates the upper flange 98 may be planar as shown in FIG. 10, but alternatively may be curved, tapered outwardly or inwardly, and the like.

Based on the anticipated wear to the upper and rearward surfaces of known tool processing systems, the material processing systems known in the art undesirably require complex fastening means to removably couple the processing tool to the tool holder. During repair or replacement of processing tools of known tool processing systems, appreciable time and expense is expended decoupling and/or coupling the replacement processing tool. Furthermore, fabricating components with complex fastening means, including the fastener itself, is also undesirable for obvious reasons.

As described, however, the processing tool system 46 of the present disclosure overcomes the above shortcomings by at least minimizing contact between the material and the tool holder 48 after the material has passed the processing tool 64. Consequently, less complex fastening means can be incorporated, which reduces downtime during repair or replacement.

Figure 12:
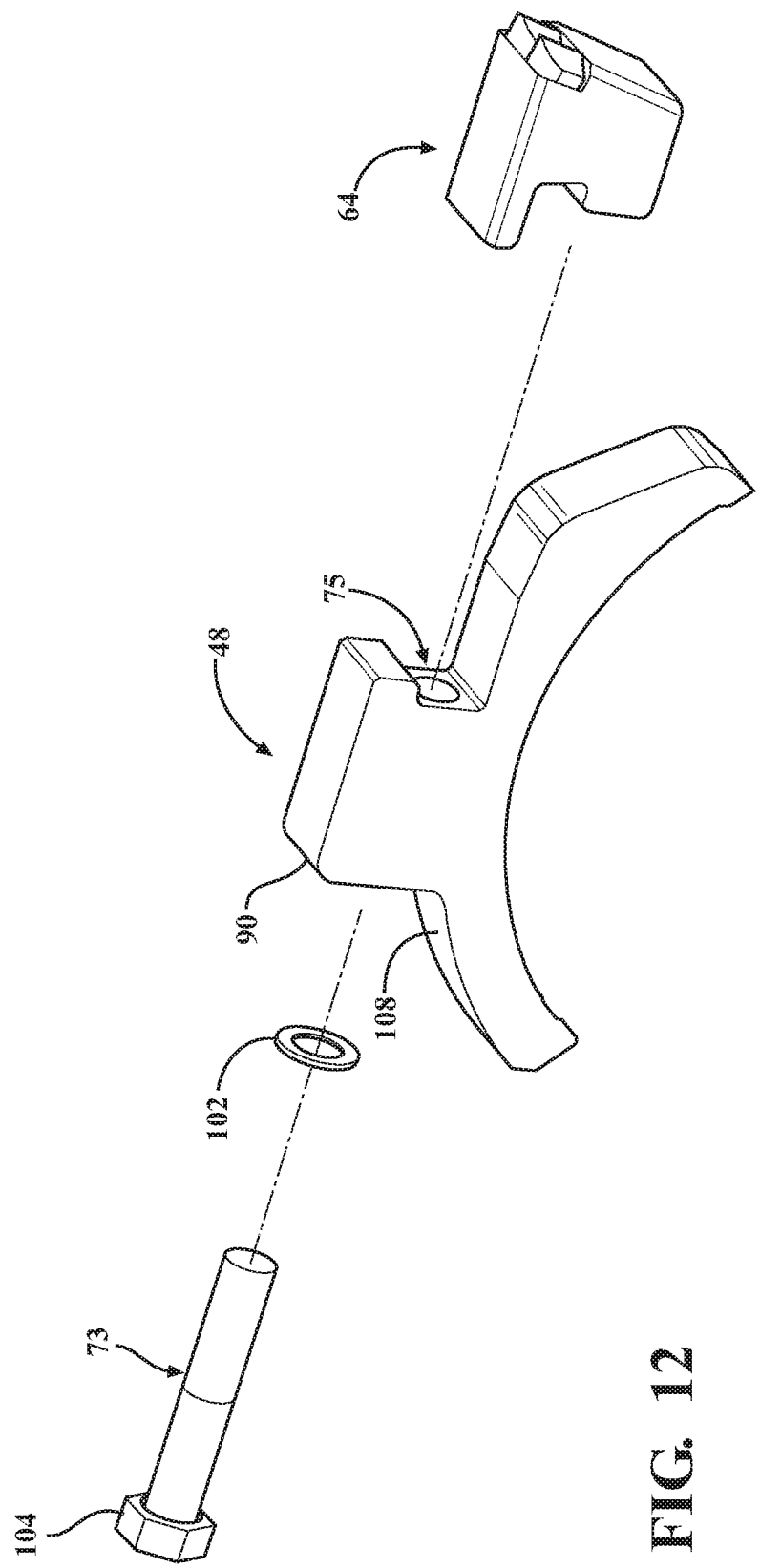
FIG. 12 is an exploded assembly view of the processing tool system of FIG. 8.
Figure 13:
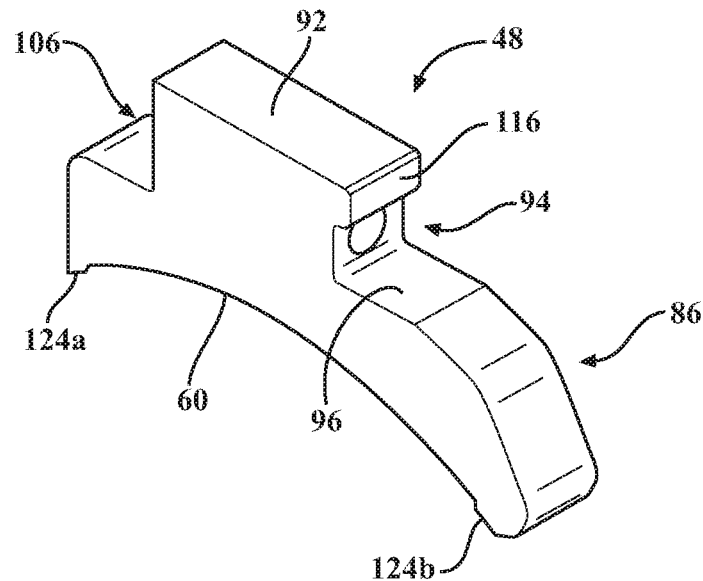
FIG. 13 is a perspective view of a tool holder of the processing tool system of FIG. 4.

Referring to FIGS. 10 and 12, the fastener 73 couples the processing tool 64 and the tool mounting portion 54. The fastener 73 extends through the borehole 75 within the tool mounting portion 54 of the tool holder 48. The fastener 73 may comprise a bolt having threads configured to engage internal threads of a bore 103 within the tool body 66 of the processing tool 64 (see FIG. 14). A spacer 102 may be disposed adjacent the head 104 of the fastener 73 as commonly known in the art. The spacer 102 may be a ring washer, spring washer, bushing, and the like.

When coupling the processing tool 64 and the tool holder 46, FIG. 10 shows the head 104 of the fastener 73 disposed with a rearward recess 106 defined by or adjacent to the rearward surface 90 of the tool mounting portion 54 and a trailing upper surface 108 of the base portion 52 (see also FIG. 14). The rearward recess 106 is suitably sized and shaped such that the material path MP substantially avoids contacting the head 104 of the fastener 73 during operation of the material reduction system 34. In the exemplary embodiment illustrated in FIG. 10, the rearward surface 90 is oriented at a right angle relative to the trailing upper surface 108. In another exemplary embodiment illustrated in FIG. 12, the rearward surface 90 is oriented at an obtuse angle relative to the trailing upper surface 108. Typically, the rearward surface 90 is vertical (i.e., when the processing tool system 46 oriented similar to FIG. 10) such that the head 104 appropriately contacts the rearward surface 90 as the fastener 73 extends horizontally through the tool mounting portion 54.

Based on the characteristics of the rearward cavity 106 as well as the altered material path MP due to the upper flange 98 of the processing tool 64, the head 104 of the fastener 73 may be positioned adjacent and/or external to the tool mounting portion 54 of the tool holder 48. The borehole 75 does not require a counterbore, a countersink, or other similar structure to recess the fastener 73, as the contact between the material and the tool holder 48 is already minimized. In addition, the fastener 73 may comprise a standard Hex bolt. Consequently, the fastener 73, and therefore the processing tool 64, may be quickly decoupled and coupled, reducing downtime. Further, the incorporation of a standard Hex bolt avoids the need for specialized tools to perform repairs or replacement of the processing tool 64. Still further, the lack of, for example, the counterbore may decrease fabrication costs of the tool holder 48. These and additional advantages of the present disclosure are readily apparent to those having skill in the art.

As the processing tool system 46 encounters more robust materials such as trees with larger trunks, stumps, and the like, each of the processing tool system 46 may effectively generate a "channel" within the material. The channel comprises a width substantially equal to a width of the processing tool. In known systems, however, the opposing sides of the tool holder undesirably experience significant friction from the channel—a concept known as "wedging"—hampering performance of the material reducing system. Features of the present disclosure provide advantages over these known systems.

Figure 11:
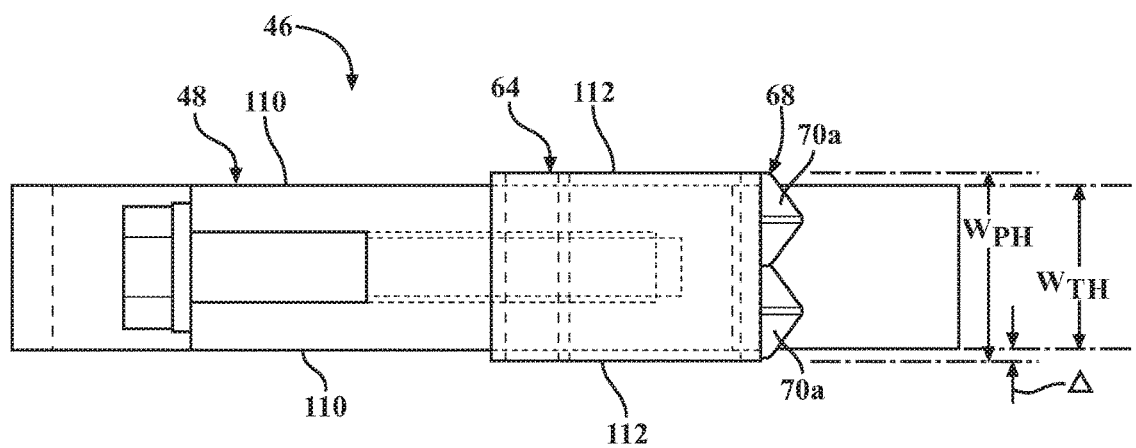
FIG. 11 is a top plan view of the processing tool system of FIG. 4.

Referring to FIG. 11, the tool holder 48 comprises two opposing sides 110 that define a width $W_{TH}$ of the tool holder 48. Likewise, the processing tool 64 comprises two opposing sides 112 that define a width $W_{PT}$ of the processing tool 64. The width $W_{PT}$ of the processing tool 64 may be greater than the width $W_{TH}$ of the tool holder 48.

The differences in widths $W_{PT}$, $W_{TH}$ is such that the reducing members 68 of the processing tool 64 create a wider channel in the material than the width $W_{PT}$ of the processing tool 64. In one example, one half of the difference, Δ, may be between 0.05 to 0.5 inches. In another non-exhaustive example, Δ may be between 0.25 and 0.35 inches, but other values are contemplated. The result effectively limits the friction between the processing tool system 46 and the channel to the length (i.e., from the reducing member 68 to the rearmost point of the upper flange 98) of the processing tool 64 as opposed to the length of the tool holder 48 (i.e., forward point of leading member 56 to rearward point of trailing member 58). The reduction in friction, particularly when aggregated over one, two, three or more dozen processing tool systems 46 disposed on the rotary drum 40, may greatly improve the overall efficiency of the material reduction system 34.

Figure 16:
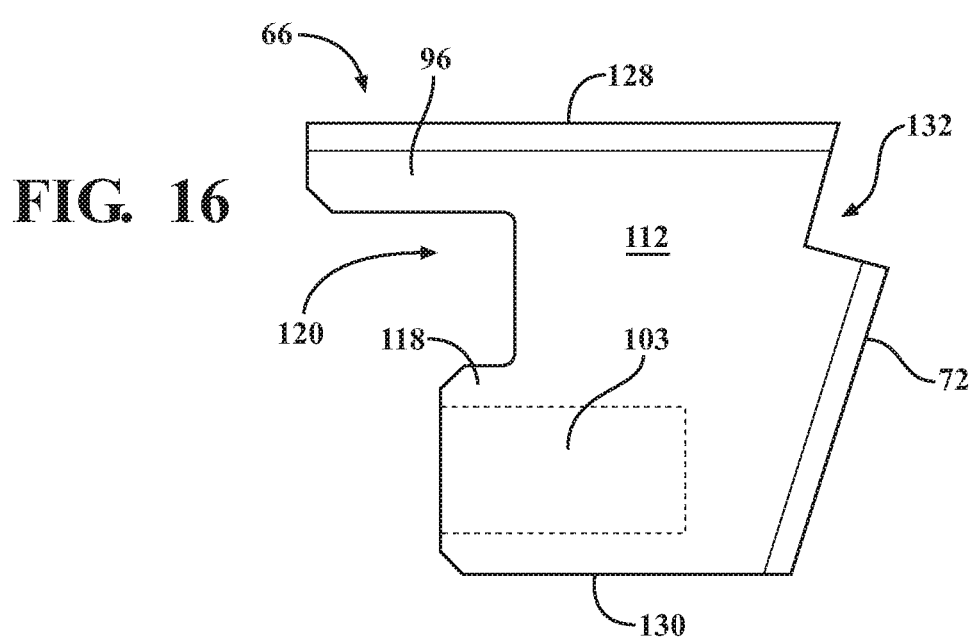
FIG. 16 is a side elevation view of the tool body of FIG. 15.

Efficient decoupling and coupling of the processing tool 64 and the tool holder 48 is one of the many advantages of the present disclosure. In addition to the accessibility and simplicity of the fastener 73, improved coupling may further be facilitated by an interlock 114 between the processing tool 64 and the tool holder 48 (FIG. 5). Referring to FIGS. 14 and 16, a projection 116 extends from the tool mounting portion 54 of the tool holder 48. More specifically, the forward surface 88 of the tool mounting portion 54 defines the projection 116 facing the operating direction OD. The projection 116 is positioned superiorly to at least a portion of the leading upper surface 96 of the base portion 52. The projection 116 may further define the forward recess 94 within which the processing tool 64 is positioned when the processing tool 64 and the tool holder 48 are coupled.

A lower flange 118 comprises a portion of the tool body 66. FIG. 16 shows the lower flange 118 extending from the tool body 66 opposite the leading face 72. The lower flange 118 may generally extend in the same direction from the tool body 66 as the upper flange 96. The lower flange 118 may be parallel to the upper flange 96. The upper flange 96, the lower flange 118, and the projection 116 may define the interlock 114.

The lower flange 118 defines a tool recess 120 between the upper flange 96 and the lower flange 118. In the exemplary embodiment illustrated in FIG. 16, the tool recess 120 is generally rectangular in shape, but other suitable shapes are contemplated such as triangular, hemispherical, and the like. The surfaces of the upper flange 96, lower flange 118, and tool recess 120 may define a tool mounting surface 122. The projection 116 is sized and shaped to fit snugly within the tool recess 120. The projection 116 is configured to removably be disposed within the tool recess 120 when the processing tool 64 is coupled to the tool holder 48, as illustrated throughout the figures.

The positioning of the projection 116 within the tool recess 120 prevents rotation of the processing tool 64 relative to the tool holder 48 during installation, removal, operation, and otherwise. In other words, the projection 116 and the tool recess 120 create an interference fit such that the processing tool 64 is prevented from rotating relative to the tool holder 48. For example in the context of coupling the processing tool 64 and the tool holder 48, the processing tool 64 is positioned on the leading upper surface 96 and slidably moved towards the tool mounting portion 54 such that the tool mounting surface 122 directly abuts the leading surface 88 of the tool holder 48. The lower flange 118 is positioned within the leading recess 94, and the projection 116 is positioned within the tool recess 120. The fastener 73 is passed through the borehole 75 such that the fastener 73 engages the bore 103 of the processing tool 64. As the fastener 73 is tightened, the processing tool 64 is prevented from rotating, permitting the installer to quickly tighten the fastener 73 to the desired torque.

Furthermore, during operation of the processing tool system 46, the interlock 114 may reduce stress on the fastener 73 and/or provide for increased security at the interface between the processing tool 64 and the tool holder 48. As compared to, for example, known systems where two planar abutting surfaces that may translate relative to one other, the present disclose provides that the upper flange 96, projection 116 and lower flange 118 interlock to prevent such translation. Thus, as material engages the reducing member 68, the processing tool 64 experiences significant forces in a direction opposite the operating direction OD. Rather than the fastener 73 bearing substantially an entirety of the forces, the shared surfaces (i.e., the leading surface 88 and the tool mounting surface 120) between the upper flange 96 and projection 116 and the projection 116 and lower flange 118 distribute the forces in an improved manner. The likelihood of processing tool failure during operation (i.e., where the tool is decoupled from the tool holder during operation of the machine, and often ejected at high speeds) may be reduced, promoting operational safety of the material reducing operation.

As mentioned, the time and expense associated with replacing or repairing the processing tool is typically a fraction of the time and expense associated with repairing or replacing the tool holder and/or the rotary drum. The additional time and expense is often due to the repairs or steps associated with welding or otherwise securing the tool holder to the rotary drum in a suitable manner. If tool holders fail during operation, it is typically a result of structural failure at or proximate to the weld fixedly securing the tool holder to the rotary drum. Most known tool processing systems comprise welding at the junction between the opposing sides of the tool holder and the outer surface of the rotary drum. The lack of suitable weld penetration often increases the likelihood of structural failure at or proximate to the weld.

The material reduction system 34 comprises set offs 124*a*, 124*b* extending from the tool holder 48. Referring to FIG.

14, the set offs 124a, 124b comprise a portion of the base portion 52 of the tool holder 48 and extend inferiorly from the base portion 52. The set offs 124a, 124b are preferably integral or unitary with the base portion 52, but discrete set offs that are coupled to the base portion are also contemplated. In the exemplary embodiment illustrated in FIG. 14, the set offs 124a, 124b comprise one set off 124a extending from the leading member 56, and another set off 124b extending from the trailing member 58. While two set offs 124a, 124b are shown, any number of set offs may be included. Further, the present disclosure contemplates the set offs 124a, 124b may be positioned as shown in FIG. 14 or at any point along the mounting surface 60.

In many respects, the set offs 124a, 124b function as legs of the tool holder 48. That is, the set offs 124a, 124b are configured to be positioned in direct contact with the rotary drum 40 when the tool holder 48 is fixedly mounted on the rotary drum 40. The set offs 124a, 124b define a gap 126 between the mounting surface 60 of the tool holder 48 and the outer surface 42 of the rotary drum 40. In one example, the gap 126 may be between 0.05 to 0.15 inches. In another non-exhaustive example, the gap 126 may be between 0.0625 and 0.09 inches, but other values are contemplated. The size of the gap 126 is typically equal to the height of the set offs 124a, 124b. Likewise, the width $W_{SO}$ of the set offs 124a, 124b may be any suitable width desired such as ¼, ½, 1 or more inches.

When positioned in direct contact with the outer surface 42 of the rotary drum 40, the gap 126 may extend along the mounting surface 60 between the set offs 124a, 124b. During the welding process, the weld is able to penetrate the gap 126 and weld or otherwise fuse greater areas of the mounting surface 60 and the outer surface 42 as opposed to only the edges shared between the tool holder and the rotary drum. Those having skill in the art readily appreciate the increase in strength associated with greater weld penetration.

In addition to increased weld penetration, the present disclosure contemplates an improved method for welding the tool holder 48 to the rotary drum 40. The tool holder 48 may be comprised of hardened steel, whereas the rotary drum 40 may be comprised of softer steel such as SAE 1010, 1020 or 1026 that is electric resistance welded (ERW) or drawn over mandrel (DOM). As known in the welding art, softer steel draws the weld to a greater extend than hardened steel. Consequently, the method comprises the step of heating the tool holder 48 prior to welding the tool holder 48 to the rotary drum 40. The heating of the tool holder 48 softens the hardened steel, thereby drawing a greater relative amount of the weld for improved weld strength.

Figure 15:
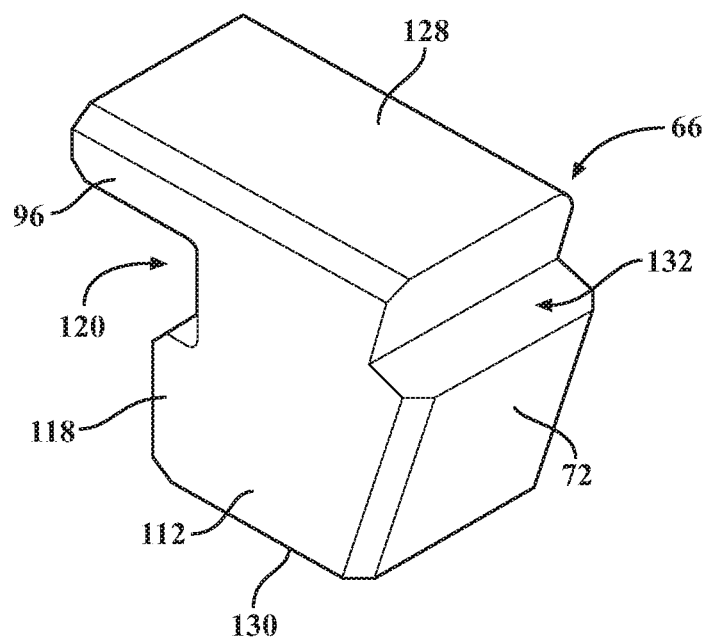
FIG. 15 is a perspective view of a tool body of the processing tool system of FIG. 4.

Referring now to FIGS. 15 and 16, an exemplary embodiment of the tool body 66 is shown. The tool body 66 comprises a top surface 128 opposite a bottom surface 130. The opposing sides 112 are separated by the top and bottom surfaces 128, 130. As mentioned, the tool body 66 may comprise a portion of the leading face 72 facing the operation direction OD. The tool mounting surface 122 is opposite the leading face 72 and configured to directly abut at least a portion of the tool holder 48, and more particularly the forward surface 88 of the tool mounting portion 56. The leading face 72 may be substantially planar and oriented towards the operating direction OD. The upper flange 96 may comprise a portion of the top surface 128, and the lower flange 118 may comprise a portion of the bottom surface 130. The upper flange 96 and the lower flange 118 define the tool recess 120.

The processing tool 64 further comprises a cavity 132 as shown in FIGS. 15 and 16. The cavity 132 is disposed within the tool body 66. More specifically, the cavity 132 is defined by a portion of the top surface 128 and a portion of the leading face 72. The cavity 132 is configured to receive the reducing member 68. In other words, the reducing member 68 are positioned or disposed within the cavity 132 when coupled to the processing tool body 66. The reducing member 68 is typically welded or brazed to the tool body 66 when disposed within the cavity 132, but other joining means are contemplated.

Figure 17:
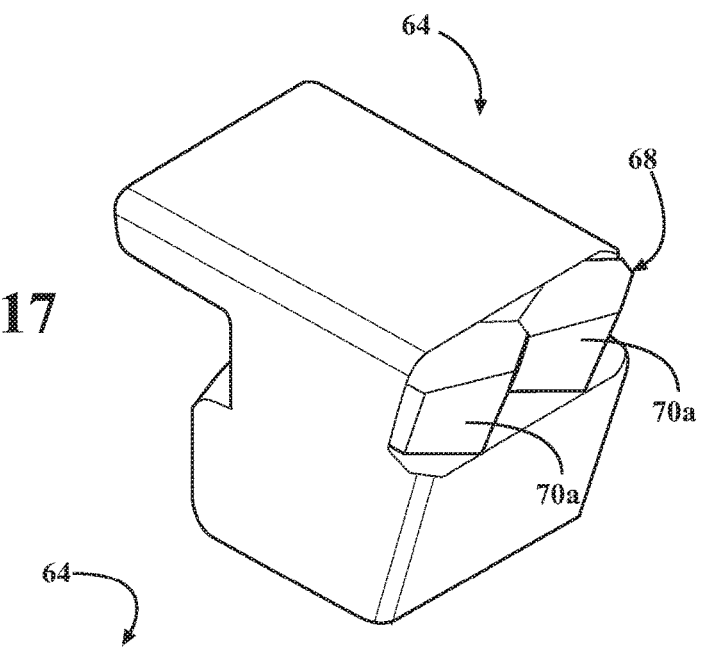
FIG. 17 is a perspective view of a processing tool of the processing tool system of FIG. 4 with processing features in accordance with an exemplary embodiment of the present disclosure.
Figure 18:
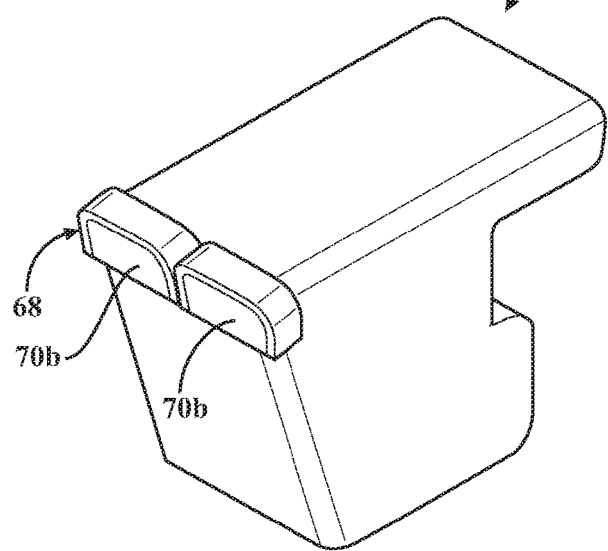
FIG. 18 is a perspective view of a processing tool with processing features in accordance with another exemplary embodiment of the present disclosure.
Figure 19:
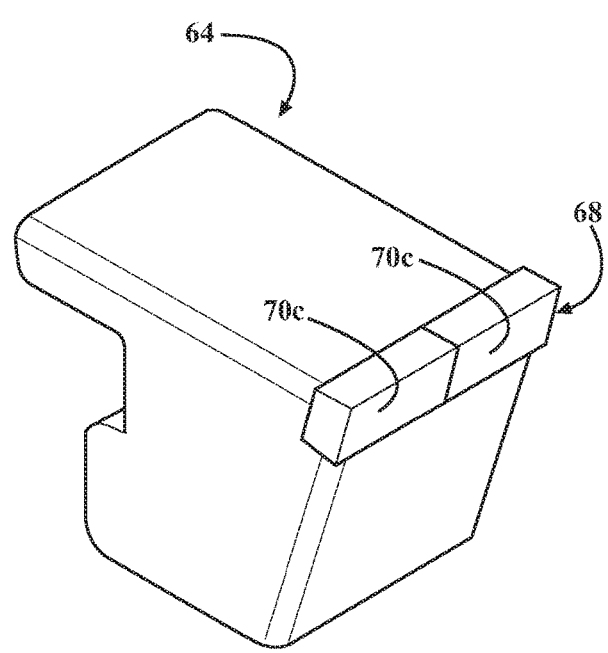
FIG. 19 is a perspective view of a processing tool with processing features in accordance with another exemplary embodiment of the present disclosure.

FIGS. 17-19 illustrate exemplary embodiments of the reducing member 68 comprising two processing teeth 70a-70c arranged in a side-by-side configuration. Referring first to FIG. 17, the processing teeth 70a are generally rounded and configured to handle impact and abrasion. The processing teeth 70a may each be approximately two inches wide, but the present disclosure contemplates any suitable width. The processing teeth 70a of FIG. 17 may be designed primarily for forestry mowers with greater than 200 horsepower. A narrower version of the processing tool 64 of FIG. 17 may be designed for applications with less than 200 horsepower.

FIGS. 18 and 19 illustrate processing teeth 70b, 70c directed to chipping material. The processing teeth 70b, 70c comprise generally planar surfaces not particularly suited for abrasive applications. The processing teeth 70b of FIG. 18 are typically designed for forestry mowers having greater than 200 horsepower such that the processing teeth 70b "push thru" the material. The processing teeth 70b of FIG. 18 comprise indents and are typically designed for forestry mowers having less than 200 horsepower. Other sizes and shapes of the processing teeth are contemplated consistent with the objects of the present disclosure described herein.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A material reduction system comprising:
    a rotary drum rotatable about a longitudinal axis in an operating direction with said rotary drum having an outer surface spaced from said longitudinal axis by a radius of curvature;
    a tool holder having,
        a base portion fixedly mounted to said outer surface of said rotary drum with said base portion having a leading member extending in said operating direction and a trailing member extending in an opposite direction from said leading member; and
        a tool mounting portion extending upwardly from said base portion with said tool mounting portion having a forward surface facing said operating direction, a rearward surface facing an opposite direction from said forward surface, and an uppermost surface between said forward and rearward surfaces with said uppermost surface above an entirety of said forward surface; and
    a processing tool removably coupled to said tool holder with said processing tool having a tool body directly abutting said forward surface of said tool mounting portion, having a reducing member, and having an upper flange comprising a lower surface with said lower surface directly abutting at least a portion of said uppermost surface of said tool mounting portion, said upper flange configured to direct the material away from said uppermost and rearward surfaces of said tool mounting portion during operation of said material reduction system;

wherein said leading member defines a raker surface;

wherein said leading face of said processing tool is positioned adjacent said leading member when said processing tool is coupled to said tool holder; and wherein said leading face is angled relative to said raker surface between 120 and 140 degrees such that material is directed into contact with the raker surface and the reducing member to limit contact of the material with the tool body and the tool mounting portion during operation of the material reduction system.

2. The material reduction system of claim 1, wherein:

said tool holder comprises a width defined between two opposing sides;

said processing tool comprises a width defined between two opposing sides; and said width of said processing tool is greater than said width of said tool holder.

3. The material reduction system of claim 1, further comprising:

a projection extending from said tool mounting portion of said tool holder; and a lower flange comprising a portion of said tool body and defining a tool recess between said upper flange and said lower flange, wherein said projection is configured to removably be disposed within said tool recess when said processing tool is coupled to said tool holder to prevent rotation of said processing tool relative to said tool holder.

4. The material reduction system of claim 1, further comprising:

a borehole extending through said tool mounting portion of said tool holder and configured to receive a fastener therethrough to removably couple said processing tool to said tool holder.

5. A material reduction system comprising:

a rotary drum rotatable about a longitudinal axis in an operating direction with said rotary drum having an outer surface spaced from said longitudinal axis by a radius of curvature;

a tool holder comprising a drum mounting surface fixedly mounted to said outer surface of said rotary drum, a leading member extending in said operating direction and including a leading upper surface and a raker surface, a trailing member extending in an opposite direction from said leading member, an uppermost surface opposite said drum mounting surface, and a forward surface extending between said leading upper surface and said uppermost surface with said uppermost surface above an entirety of said forward surface; and a processing tool removably coupled to said tool holder, said processing tool comprising a reducing member and defining a leading face, and an upper flange extending from said processing tool in a direction away from said leading face, wherein said upper flange comprises a lower surface with said lower surface directly abutting at least a portion of said uppermost surface, said upper flange configured to direct the material away from said uppermost surface during operation of said material reduction system;

wherein said leading face of said processing tool is positioned adjacent said leading member when said processing tool is coupled to said tool holder; and wherein said leading face is angled relative to said raker surface between 120 and 140 degrees such that material is directed into contact with the raker surface and the reducing member to limit contact of the material with the tool body and the tool mounting portion during operation of the material reduction system;

an interlock between said processing tool and said tool holder, said interlock comprising:

a projection extending from said tool holder with said projection defining a forward recess between said projection and said leading upper surface of said leading member; and a lower flange extending from said processing tool in a direction away from said leading face to define a tool recess between said upper flange and said lower flange, wherein said projection is configured to removably be disposed within said tool recess and at least a portion of said upper flange is located rearward of said forward surface when said processing tool is coupled to said tool holder.

6. The material reduction system of claim 5, wherein:

said tool holder comprises a width defined between two opposing sides;

said processing tool comprises a width defined between two opposing sides; and said width of said processing tool is greater than said width of said tool holder.

7. The material reduction system of claim 5, further comprising set offs extending from said tool holder, said set offs configured to be positioned in direct contact with said rotary drum when said tool holder is fixedly mounted on said rotary drum, wherein said set offs define a gap between said mounting surface of said tool holder and said outer surface of said rotary drum.

8. The material reduction system of claim 5, wherein said processing tool has a tool body configured to directly abut said forward surface when said processing tool is coupled to said tool holder.

9. The material reduction system of claim 5, wherein said processing tool further defines a cavity and said reducing member is disposed within said cavity.

10. The material reduction system of claim 9, wherein said reducing member is welded or brazed to said processing tool.

11. The material reduction system of claim 9, wherein said reducing member comprises two teeth arranged in a side-by-side configuration.

* * * * *